United States Patent [19]

Zievers et al.

[11] Patent Number: 5,238,478

[45] Date of Patent: Aug. 24, 1993

[54] CERAMIC FILTER ELEMENT AND METHOD OF MANUFACTURE

[76] Inventors: James F. Zievers; Elizabeth C. Zievers, both of 1240 Carriage La., LaGrange, Ill. 60525; Paul Eggerstedt, 25054 W. Pauline Dr., Plainfield, Ill. 60544

[21] Appl. No.: 856,393

[22] Filed: Mar. 23, 1992

[51] Int. Cl.$^5$ ............................................. B01D 39/20
[52] U.S. Cl. .............................................. 55/523; 55/524
[58] Field of Search ................ 55/523, 524, DIG. 15, 55/DIG. 30

[56] References Cited

U.S. PATENT DOCUMENTS

| | | | |
|---|---|---|---|
| 4,559,193 | 12/1985 | Ogawa et al. | 55/523 X |
| 4,704,863 | 11/1987 | Abthoff et al. | 55/523 X |
| 4,968,467 | 11/1990 | Zievers | 55/523 X |
| 5,073,432 | 12/1991 | Horikawa et al. | 55/523 X |

*Primary Examiner*—Charles Hart
*Attorney, Agent, or Firm*—Edmond T. Patnaude

[57] ABSTRACT

An improved filter candle is provided for filtering entrained particulate matter from hot gasses. The filter candle is constructed ceramic fibers bonded together into a porous unitary tubular mask having a bottom end and an annular flange at the top end. The top and bottom ends of the filter have substantially higher density than the tubular mid-section of the filter and as a result, the strength of the end portions of the filter is enhanced, and the ends are therefore less susceptible to damage.

8 Claims, 1 Drawing Sheet

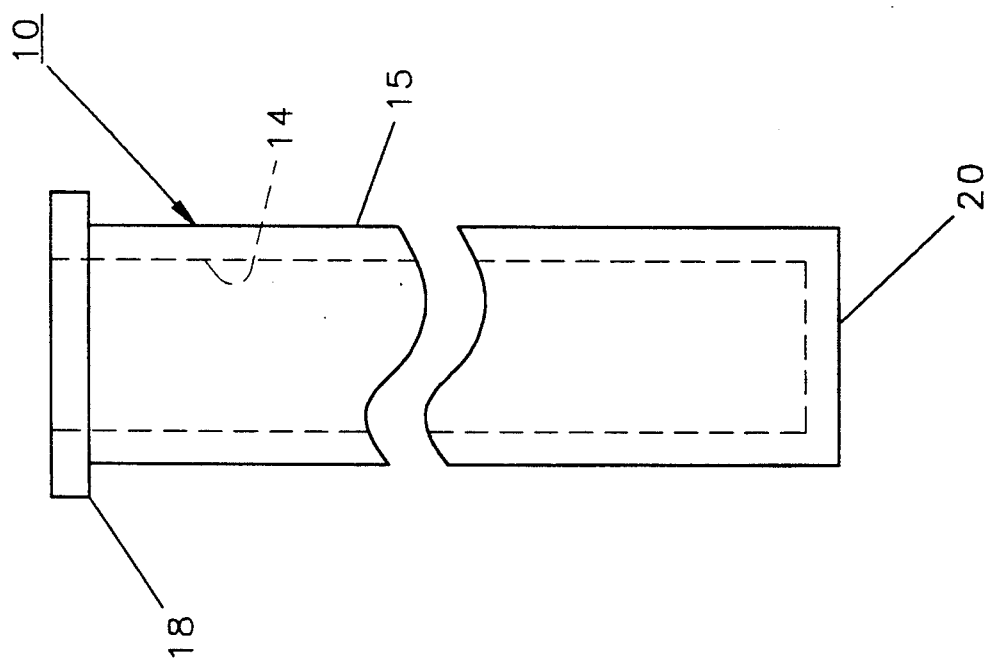

CERAMIC FILTER ELEMENT AND METHOD OF MANUFACTURE

The present invention relates in general ceramic filter elements of the type commonly known as candles, and it relates more particularly to a new and improved ceramic filter element and to a method of manufacturing ceramic filter elements.

BACKGROUND OF THE INVENTION

Candle filter elements are often used in the filtration of gasses containing entrained particulate matter. Where the gasses are corrosive and are at high temperatures as is the case with flue gasses, such filter elements are preferably formed of ceramic. For many years such filter elements were heavy and relatively fragile. U.S. Pat. No. 4,968,467 describes an improved ceramic filter element which is formed entirely of ceramic but is not as brittle and fragile as the earlier types of ceramic filter elements. This patented candle filter element comprises a ceramic skeletal base which is filled with a porous ceramic material. The skeletal base consists of randomly disposed ceramic fibers bonded together at their intersections, with the interstices filled or partially filled with ceramic particles which are bonded to one another and to the skeletal base to form a unitary elongate tubular filter element which is open at one end and closed at the other.

In order to facilitate the mounting of filter candles within a filter tank, the open ends thereof are usually provided with external annular flanges which are adapted to fit into the counterbores of a tube sheet or the like from which the filter candles are suspended in the filter chamber. Although the said patented candles are stronger than the prior art type candles which did not include a skeletal base, they are still somewhat fragile, and because of the relatively great length and narrow width thereof, it has been found that the ends of the candles are subjected to substantial stress during use and shipment and are, therefore, frequently broken. One attempt to reduce such breakage has been to embed perforate metallic reinforcing members in the end portions of the candles.

SUMMARY OF THE INVENTION

Briefly, there is provided in accordance with the one aspect of the present invention a new and improved filter candle wherein the ends of the candle are relatively nonporous while the intermediate part is sufficiently porous to function as a filter element. The nonporous end portions are several times more dense than the intermediate porous section of the candle and are thus substantially stronger in shear, tension and compression and are less brittle than the intermediate section of the filter element which is porous and functions to pass gas during a filter operation.

In accordance with another aspect of the invention one or both end portions of a filter candle are strengthened by dipping the ends of a porous ceramic filter candle into a shallow liquid bath comprising a colloidal dispersion of a ceramic material and a binder for a brief predetermined time, and after removal from the bath the candle is then heat treated to dry and solidify the ceramic material and binder material which is contained in the pores of the end portions of the candle and which become an integral part of the candle. In one embodiment colloidal silica is added to the end portions of the filter candle, and in another embodiment colloidal alumina is added to the end portions of the filter candle.

In accordance with a preferred embodiment of the invention, both end portions of a porous ceramic filter candle are initially saturated with water and then dipped in a colloidal dispersion of sub-micron size colloidal silica and a liquid high temperature binder for a short time, then removed from the bath and air dried at an elevated temperature. Subsequently, the end portions of the candle are dipped into a solution of submicron size colloidal alumina and a high temperature liquid binder and after removal from the bath are again dried at an elevated temperature. This strengthening method results in a filter candle having end portions which contain added amounts of silica and alumina and which are substantially more dense and substantially stronger than the remainder of the candle. The advantage of this candle is that it incorporates the strength of silica and the corrosion resistance of alumina. Moreover, while silica tends to vitrify at a temperature of about sixteen hundred degrees Fahrenheit, alumina is less temperature sensitive and maintains its strength up to temperatures of about 1800 to 2100 degrees Fahrenheit. During the second application of the alumina to the candle, the silica particles are coated with alumina thus making the strengthened ends of the candle more heat tolerant because of the alumina coating and stronger because of the silica.

GENERAL DESCRIPTION OF THE DRAWINGS

The present invention will be better understood from a reading of the following detailed description taken in connection with the accompanying drawing wherein the single figure is an elevational view, partly in cross-section, of a filter element embodying the present invention.

DETAILED DESCRIPTION OF A PREFERRED EMBODIMENT

Referring to the drawing, an elongate generally cylindrical ceramic candle filter element 10 has a cylindrical body section which encloses a cylindrical central chamber 14 enclosed by a tubular wall 15. At one end of the wall 15 there is provided an integral external annular flange 18 which is used in the customary manner in the mounting of the candle element 10 in a filter tank. As described in greater detail hereinafter, the flange 18 and the adjacent portions of the candle 10 have a substantially greater density than that of the wall 15. At the other end of the wall 15 the chamber 14 is sealably closed by an integral end wall 20. The end wall 20 and the adjacent portions of the candle have a substantially greater density than the that of the intermediate portion of the wall 15.

The intermediate portion of the candle extends from a short distance of about one and one-half inches or less from the end wall 20 to a short distance of about one and one-half inches from the flange 18 and is of the required porosity to remove particulate matter from a gas which is passed therethrough. It will be understood that these distances are not critical but may vary with the size and strength of the candle. Where the gas to be filtered is corrosive in nature and is at a high temperature of say fifteen hundred degrees Fahrenheit or more, the filter candle 10 is preferably formed of ceramic. The wall 15 has a thickness sufficient to prevent bending and fracturing of the filter candle during shipment, installation and use.

In order to increase the strength of the closed and open end portions of the filter element, after the basic filter element has been manufactured, i.e. in a preferred embodiment of the invention, the interstices in a ceramic skeleton base have been partially filled with a ceramic and dried to provide a porous unitary integral member, the pores in the end portions of the candle 10 are then further filled with additional ceramic particles so that the density of the end portions of the candle are increased and the porosity of the end portions is greatly reduced or in some cases the end portions are made non-porous. The resulting candle thus has nonporous strengthened end portions and a porous intermediate portion which functions as a filter as the gas to be filtered is passed therethrough.

The increased strength of the flanged end prevents breakage of the candle due to stresses exerted thereon due to lateral movement of the candle during use and due to the substantial tensile force which is exerted thereon when high pressure pulses of gas are applied to the interior of the candle during backwash cleaning. During this same backwash cleaning operation a substantial force is also exerted on the inner face of the end wall 20.

In accordance with one method of strengthening the end portions of the candle, each end portion of the candle is first saturated with water and then immersed a short distance of say one-half inch into a colloidal solution containing a liquid binder and sub-micron size ceramic particles. In a reduction to practise of the invention, the solution contained between 10% and 20% colloidal silica in a liquid bath of ammonia and water. Since the candle is porous, it is important that the end portions be immersed in the colloidal solution for a brief time only so as to prevent the liquid solution from penetrating the intermediate filter portion of the candle due to capillary attraction or wicking. It has been found that the candles should be dipped in the colloidal solution for no more than about five seconds to completely saturate the end portions of the candles with a silica colloidal solution. Also, increasing the density of about two inches at both ends of the candle prevents most breakage of the candles and does not reduce the useful filter surface area by an intolerable amount.

After the ends of the candle have been thus dipped the candle is immediately thereafter subjected to a heat treating process wherein the candle is heated to a temperature of about six hundred degrees Fahrenheit for about one hour to thoroughly dry the candle so that the ceramic particles are bonded in the end portions of the candle. The exact drying time will depend on the size and porosity of the candle.

We have found that best results are achieved when the strengthening solution penetrates about the end to about two inches. The depth of immersion in the colloidal bath is not critical but the shallower the bath is the longer must be the time of immersion. On the other hand, too great a depth of immersion will reduce the useful filter surface of the intermediate filter section of the candle by filling the pores of the filter section and as a consequence reduce gas flow therethrough.

In one embodiment of the invention, the colloidal solution contains sub-micron size silica particles. A successful reduction to practise of the invention resulted from the use of a colloidal solution sold by Nalco Corporation under the trademark NALCOAG 1050 which has the following properties:

| | |
|---|---|
| Colloidal Silica as SiO2 spheres | 50% |
| pH | 9.0 |
| Average particle size | .17–.25 microns |
| Average surface area | 120–176 M2/gram |
| Specific gravity at 68 degrees F. | 1.390 minimum |
| Viscosity at 77 degrees F. | 70 cp max |

In accordance with of another embodiment of the invention the end portions of the candle are first saturated with water and then dipped in a colloidal solution of a high temperature binder and sub-micron size alumina particles. The candle is subsequently dried at a temperature of about six-hundred degrees Fahrenheit to bond the alumina particles in the end portions of the candle.

In order to still further increase the strength of the end portions of the candle 10, after the end portions have been strengthened by dipping in a colloidal solution of sub-micron silica particles and a high temperature binder and subsequent drying, the end portions are immersed or dipped in a second colloidal solution of alumina and a high temperature binder for a sufficient time only to saturate the end portions of the candle and then removed from the solution and dried at a temperature of about six hundred degrees Fahrenheit for about one hour.

The end portions of the candle which have thus been subjected to this strengthening process have a density of two to three times that of the untreated wall portion 15 of the candle making the end portions substantially stronger, more rigid, and more durable. Candles with the end two inches strengthened are much less susceptible to damage during use and shipment. Moreover, where the ends are to be extremely dense and substantially nonporous, the candle ends may be dipped twice in colloidal silica with a drying step following each dip prior to the colloidal alumina dip.

For some applications it may not be necessary to strengthen both end portions of the candles, and in those cases only one end of the candle need be subjected to the strengthening process. However, it is believed that for most applications it is desirable to strengthen both end portions of the candles, since both ends are particularly susceptible to damage during use and shipment.

The advantages achieved by filling the end portions of the candles with both silica and alumina particles is that the silica provides greater strength than is provided by alumina alone while the alumina provides greater corrosion resistance and is less sensitive to high temperatures exceeding 1600 degrees Fahrenheit. When filtering flue gasses, temperatures of 1800–2100 degrees Fahrenheit are common, and since silica vitrifies at temperatures of about 1600 degrees Fahrenheit, the alumina maintains the strength of the end portions of the candle.

While the present invention has been described in connection with particular embodiments thereof, it will be understood that those skilled in the art may make many changes and modifications without departing from the true spirit and scope of the invention. Therefore, it is intended by the appended claims to cover all such changes and modifications which come within the true spirit and scope of the invention.

What is claimed:

1. A unitary ceramic candle filter element having an open end section, a closed end section, and an intermediate porous filter section extending from said open end section to said closed end section, said open end section and said intermediate filter section having a centrally disposed bore extending completely therethrough, said candle filter element comprising in combination said intermediate section being tubular and formed of ceramic, and being sufficiently porous to pass gas therethrough, said bore being cylindrical and having a substantially constant diameter throughout the length thereof, and at least one of said end sections having a density greater than twice the density of said intermediate filter section.

2. A candle filter element according to claim 1 wherein said one of said end portions has a greater concentration of silica than said intermediate portion.

3. A candle filter element according to claim 1 wherein said one of said end portions has a greater concentration of alumina than said intermediate portion.

4. A candle filter element according to claim 1 wherein said one of said end portions has a greater concentration of alumina and silica than said intermediate portion.

5. A method of strengthening an end section of a ceramic candle filter element having a cylindrical bore extending through an open end section of said element and through an intermediate porous section of said element to a closed end of said filter element, said open end section having inner and outer cylindrical walls and a distal end wall, comprising the steps of completely immersing only said open end section of said candle filter element in a colloidal solution of sub-micron size ceramic particles to cause said solution to penetrate said open end section through said inner and outer cylindrical wall and said distal end wall, removing said open end section of said candle filter element from said solution, and then drying said open end section of said candle filter element at an elevated temperature to bind said silica particles within said end section of said filter element, said end section of said candle filter element being immersed in said colloidal solution for a sufficient time so that after said step of drying said end section of said candle filter element has a density which is at least twice that of the intermediate section of said element.

6. The method according to claim 5 wherein said ceramic particles are silica.

7. The method according to claim 5 wherein said ceramic particles are alumina.

8. The method according to claim 6 comprising the additional steps of immersing the dried end portion of said candle filter element in a colloidal solution of sub-micron size alumina particles and a high temperature binder, removing said end portion of said candle filter element from said solution, and drying said end portion at an elevated temperature to bond said alumina particles within said end portion of said candle filter element.

* * * * *